United States Patent [19]
Kleindienst et al.

[11] 3,813,930
[45] June 4, 1974

[54] MEASURING HEADS FOR STRENGTH TESTERS

[75] Inventors: Horst Kleindienst, Uster; Gerold Roos, Esslingen; Rudolf Zingg, Duebendorf, all of Switzerland

[73] Assignee: Zellweger Ltd., Uster, Switzerland

[22] Filed: Mar. 27, 1972

[21] Appl. No.: 238,334

[30] Foreign Application Priority Data
June 17, 1971 Switzerland.................... 8835/71

[52] U.S. Cl. ............................................. 73/95.5
[51] Int. Cl. ............................................. G01n 3/04
[58] Field of Search................. 73/95.5, 159, 141 A; 242/148

[56] References Cited
UNITED STATES PATENTS
3,140,601  7/1964  Weyland et al..................... 73/95 X
3,618,373  11/1971  Peisl et al. ........................ 73/95.5 X Primary Examiner—Jerry W. Myracle
Attorney, Agent, or Firm—Craig and Antonelli

[57] ABSTRACT

An improvement in measuring heads for yarn testers wherein a test clamp is mounted at the free end of a leaf spring arrangement whose other end is fixed so that the force applied to the test clamp can be measured by the amount of deflection of the leaf spring arrangement.

12 Claims, 2 Drawing Figures

MEASURING HEADS FOR STRENGTH TESTERS

The invention relates in general to testing devices for textile products, and more particularly to improvements in measuring heads for yarn strength testers.

In testing apparatus for the determination of the load-elongation-characteristic of elongated materials, such as yarns in the textile industry, the sample yarn will be clamped between two test clamps. For the automatic running test the opening of the clamp will take place for example by a mechanical pressure applied to a rod which is subjected to the tension of a closure spring.

In known embodiments of measuring heads for strength testers, the test clamps on the one hand and the measuring device on the other hand are separated locally and are coupled by an interconnection. Due to the small deviations of the measuring device by the stretch exerted on the test sample such interconnections can cause an inadmissible amount of additional displacement; for example, as the result of tolerances in the bearings.

The present invention overcomes these inconveniences and thereby provides improvements in a measuring head for strength testers, in which the clamp is secured to a leaf spring, the displacement of which serves for the measurement of the force appearing at the test sample, and wherein the test clamp and the measuring leaf spring are interchangeable jointly as a unit.

Figure 1:
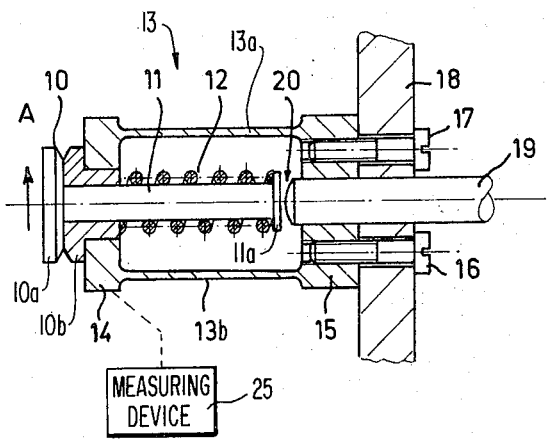
Figure 2:
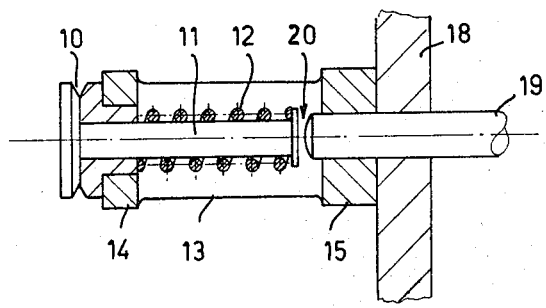

FIGS. 1 and 2 illustrate one exemplary embodiment of the present invention, whereby FIG. 1 shows a measuring head in side elevation and FIG. 2 shows the same head in ground elevation. In the following description the invention will be explained.

The test clamp 10, known per se, made up of clamping members 10a and 10b, is held in closed position by means of a compression spring 12 acting between the inner end face of clamping member 10b and a head 11a on a shaft 11, the other end of which passes through an opening in the clamping member 10b and is secured to the clamping member 10a, so that the members 10a and 10b are held together by the force of spring 12. In accordance with the present invention, the test clamp 10 is fixed at the end of a leaf spring 13. The base 15 of this leaf spring arrangement 13 is secured to a case or support 18, for instance, by means of screws 16 and 17. A displaceable bolt 19, which serves as a pressing member, is mounted in alignment with shaft 11 so that it can be urged against shaft 11 and, consequently, open test clamp 10 when it is desired to insert or remove the yarn. In normal position, between shaft 11 and bolt 19 a gap 20 exists, for avoiding a disturbance of the free displacement of the end 14 of the leaf spring arrangement at the appearance of a load in the direction of arrow A on the test clamp.

The leaf spring arrangement 13 comprises a base 15 having threaded holes to accommodate the fastening screws 16 and 17 and a central hole to accommodate the passage of the pressing member 19. The free end 14 of the arrangement 13 has a central aperture within which is fixed the clamping member 10b. Finally, a pair of leaf spring members 13a and 13b are positioned diametrically and interconnect the base 15 and the free end 14 so that the free end 14 is capable of flexing in the direction of arrow A upon application of a force in that direction to the test clamp 10.

The amount of the load can be represented as the magnitude of the displacement of the end 14 of leaf spring arrangement 13; whereby, for the determination of this displacement, a conventional mechanical or electrical measuring device 25 is operatively associated with the leaf spring arrangement 13.

For the coverage of different measuring ranges for the load it is only necessary to select a measuring leaf spring arrangement 13 having an inserted test clamp 10 which is suitable to cover the required load range. Since the combination of the leaf spring arrangement 13 and test clamp 10 can be replaced simply by removing screws 16 and 17, the selection of different test clamps can be carried out very simply.

What is claimed is:

1. A measuring head for textile strength testers, comprising a test clamp; a measuring leaf spring arrangement including a fixed base portion, an intermediate spring portion and a free end portion, said test clamp being directly mounted on said free end portion through an aperture in said free end portion; measuring means for measuring the displacement of said free end portion; and a fixed support, said measuring leaf spring arrangement being removably secured to said fixed support at said fixed base portion, whereby the spring loading characteristics of the measuring leaf spring arrangement are varied by removable replacement of the measuring leaf spring arrangement.

2. A measuring head as defined in claim 1 wherein said test clamp includes first and second clamping members and means for biasing said clamping members into contact with one another with a predetermined force.

3. A measuring head as defined in claim 2 wherein said biasing means includes a shaft having one end freely passing through an aperture in said first clamping member and secured to said second clamping member, the other end of said shaft having an enlarged head, and a coil spring extending between said first clamping member and said enlarged head on said shaft.

4. A measuring head as defined in claim 3 wherein said measuring leaf spring arrangement comprises a base member capable of being removably secured to said fixed support, an end member secured to said first clamping member of said test clamp, and a pair of diametrically disposed leaf spring members interconnecting said base member and said end member.

5. A measuring head as defined in claim 4 wherein said aperture in said free end portion secures said first clamping member and through which said shaft protrudes.

6. A measuring head as defined in claim 5 wherein said base member is provided with an aperture, and further including a push member extending through said aperture in said base member into spaced relationship with the enlarged head of said shaft.

7. A measuring head as defined in claim 1 wherein said intermediate spring portion of said measuring leaf spring arrangement comprises at least one leaf spring interconnecting said base portion and said free end portion.

8. A measuring head as defined in claim 1 wherein said intermediate spring portion of said measuring leaf spring arrangement comprises a pair of leaf springs interconnecting said base portion and said free end portion.

9. A measuring head as defined in claim 1, further comprising means for applying a force to said test clamp wherein the free end is displaced.

10. A measuring head for textile strength testers, comprising a test clamp including first and second clamping members and means for biasing said clamping members into contact with one another with a predetermined force and a spring member having one end fixed and a free end directly secured to said test clamp, said first clamping member of said test clamp mounted on said free end through an aperture, and said test clamp and spring member being removably secured to a fixed support, whereby the spring loading characteristics of the spring member are varied by removable replacement of the test clamp and spring member.

11. A measuring head as defined in claim 10 wherein said spring member comprises at least one leaf spring.

12. A measuring head as defined in claim 10, further comprising means for applying a force to said test clamp wherein said free end is displaced by a measured amount in response to the force.

* * * * *